(12) United States Patent
Airaud et al.

(10) Patent No.: US 11,157,277 B2
(45) Date of Patent: Oct. 26, 2021

(54) DATA PROCESSING APPARATUS WITH RESPECTIVE BANKED REGISTERS FOR EXCEPTION LEVELS

(71) Applicant: Arm Limited, Cambridge (GB)

(72) Inventors: Cedric Denis Robert Airaud, Saint Laurent du Var (FR); Albin Pierrick Tonnerre, Nice (FR); Luca Nassi, Antibes (FR); Remi Marius Teyssier, Le Bar sur loup (FR)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/561,430

(22) Filed: Sep. 5, 2019

(65) Prior Publication Data

US 2020/0110613 A1 Apr. 9, 2020

(30) Foreign Application Priority Data

Oct. 4, 2018 (GB) ...................................... 1816217

(51) Int. Cl.
*G06F 9/30* (2018.01)
*G06F 9/38* (2018.01)
(52) U.S. Cl.
CPC ........ *G06F 9/30123* (2013.01); *G06F 9/3012* (2013.01); *G06F 9/30116* (2013.01); *G06F 9/384* (2013.01)
(58) Field of Classification Search
CPC .. G06F 9/30123; G06F 9/3012; G06F 9/3863; G06F 9/3861; G06F 9/461;

(Continued)

(56) References Cited

U.S. PATENT DOCUMENTS 5,386,563 A * 1/1995 Thomas ................. G06F 9/462
710/260
6,298,431 B1 10/2001 Gottlieb
(Continued)

OTHER PUBLICATIONS

Andrew Sloss, Dominic Symes and Chris Wright, "Arm System Developer's Guide Designing and Optimizing System Software", Elsevier, pp. 19-44 (Year: 2004).*

(Continued)

*Primary Examiner* — William B Partridge
*Assistant Examiner* — Courtney P Carmichael-Moody
(74) *Attorney, Agent, or Firm* — Nixon & Vanderhye P.C.

(57) ABSTRACT

Data processing apparatus comprises a processing element configured to access an architectural register representing a given system register; mapping circuitry to map the architectural register representing the given system register to a physical register selected from a set of physical registers; a register bank having a set of two or more respective banked versions of the given system register, in which a respective one of the banked versions of the system register is associated with each of a plurality of current operating states of the processing element; in which, when the processing element changes operating state from a first operating state associated with a first one of the banked versions of the system register to a second operating state associated with a second, different, one of the banked versions of the system register, the processing element is configured to store the current contents of the architectural register representing the given system register to the first one of the banked versions of the system register and to copy the contents of the second one of the banked versions of the system register to the architectural register representing the given system register.

9 Claims, 4 Drawing Sheets

(58) Field of Classification Search
CPC . G06F 9/462; G06F 9/384; G06F 9/48; G06F 9/3842; G06F 9/3857
See application file for complete search history.

(56) References Cited

U.S. PATENT DOCUMENTS

| | | | | |
|---|---|---|---|---|
| 2002/0042874 | A1* | 4/2002 | Arora | G06F 9/4403 712/229 |
| 2003/0226001 | A1* | 12/2003 | Moyer | G06F 9/30123 712/228 |
| 2009/0144481 | A1 | 6/2009 | Julicher et al. | |
| 2010/0205387 | A1* | 8/2010 | Sun | G06F 9/30123 711/154 |
| 2011/0225402 | A1* | 9/2011 | Grisenthwaite | G06F 9/30189 712/244 |
| 2011/0307681 | A1* | 12/2011 | Piry | G06F 9/45558 711/203 |

OTHER PUBLICATIONS

Combined Search and Examination Report for GB1816217.2 dated Mar. 25, 2019, 5 pages.

\* cited by examiner

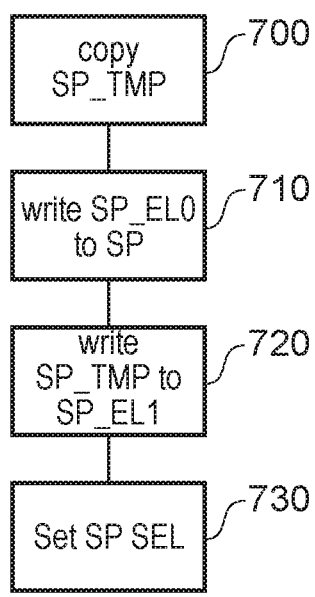
FIG. 5
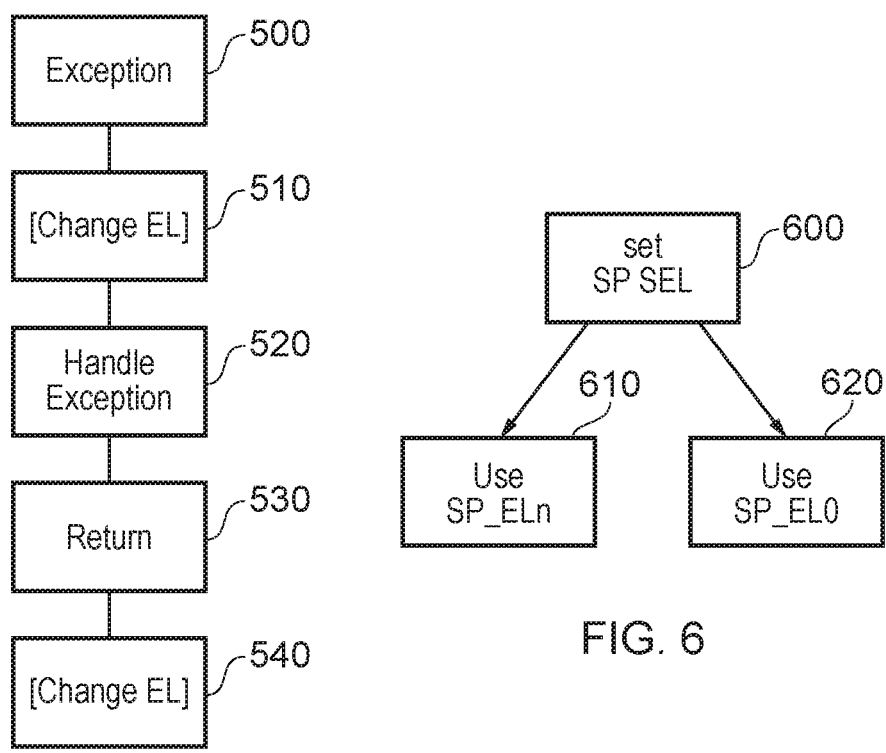
FIG. 6
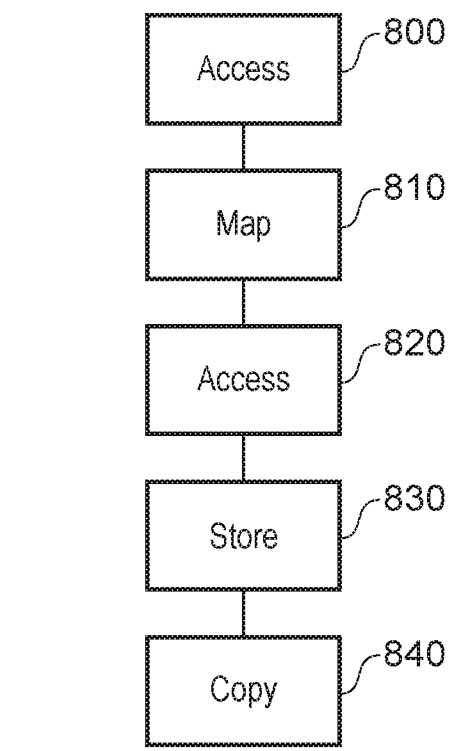
FIG. 7
FIG. 8

DATA PROCESSING APPARATUS WITH RESPECTIVE BANKED REGISTERS FOR EXCEPTION LEVELS

This application claims priority to GB Patent Application No. 1816217.2 filed Oct. 4, 2018, the entire content of which is hereby incorporated by reference.

BACKGROUND

This disclosure relates to data processing.

Some data processors operate according to operating states such as so-called "exception levels", with for example a current exception level being selected from a set of multiple exception levels each corresponding to a different level of execution privilege, ranging from a level representing unprivileged execution to higher levels of privilege. At the lowest level of execution, software being executed may have limited access to one or more of the list consisting of: (i) certain instruction types, (ii) system facilities such as a system timer or system controller, (iii) memory, certain memory address ranges, or peripherals.

In response to switching between exception levels, a different version of one or more system registers such as a so-called stack pointer (SP) register may be required, so that a version appropriate to the current exception level is used.

One previously proposed way to provide for such multiple versions is to provide a so-called banked register in which the processor can switch between multiple physical versions. Another previously proposed way is to provide multiple architectural registers mapped by mapping circuitry to respective physical registers.

SUMMARY

In an example arrangement there is provided data processing apparatus comprising:

a processing element configured to access an architectural register representing a given system register;

mapping circuitry to map the architectural register representing the given system register to a physical register selected from a set of physical registers;

a register bank having a set of two or more respective banked versions of the given system register, in which a respective one of the banked versions of the system register is associated with each of a plurality of current operating states of the processing element;

in which, when the processing element changes operating state from a first operating state associated with a first one of the banked versions of the system register to a second operating state associated with a second, different, one of the banked versions of the system register, the processing element is configured to store the current contents of the architectural register representing the given system register to the first one of the banked versions of the system register and to copy the contents of the second one of the banked versions of the system register to the architectural register representing the given system register.

In another example arrangement there is provided a method comprising:

accessing an architectural register representing a given system register;

mapping the architectural register representing the given system register to a physical register selected from a set of physical registers;

accessing a register bank having a set of two or more respective banked versions of the given system register, in which a respective one of the banked versions of the system register is associated with each of a plurality of current operating states of the processing element;

in response to a change of operating state from a first operating state associated with a first one of the banked versions of the system register to a second operating state associated with a second, different, one of the banked versions of the system register, storing the current contents of the architectural register representing the given system register to the first one of the banked versions of the system register and copying the contents of the second one of the banked versions of the system register to the architectural register representing the given system register.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIGS. 4 to 8 are schematic flowcharts illustrating respective methods.

DESCRIPTION OF EMBODIMENTS

Figure 1:
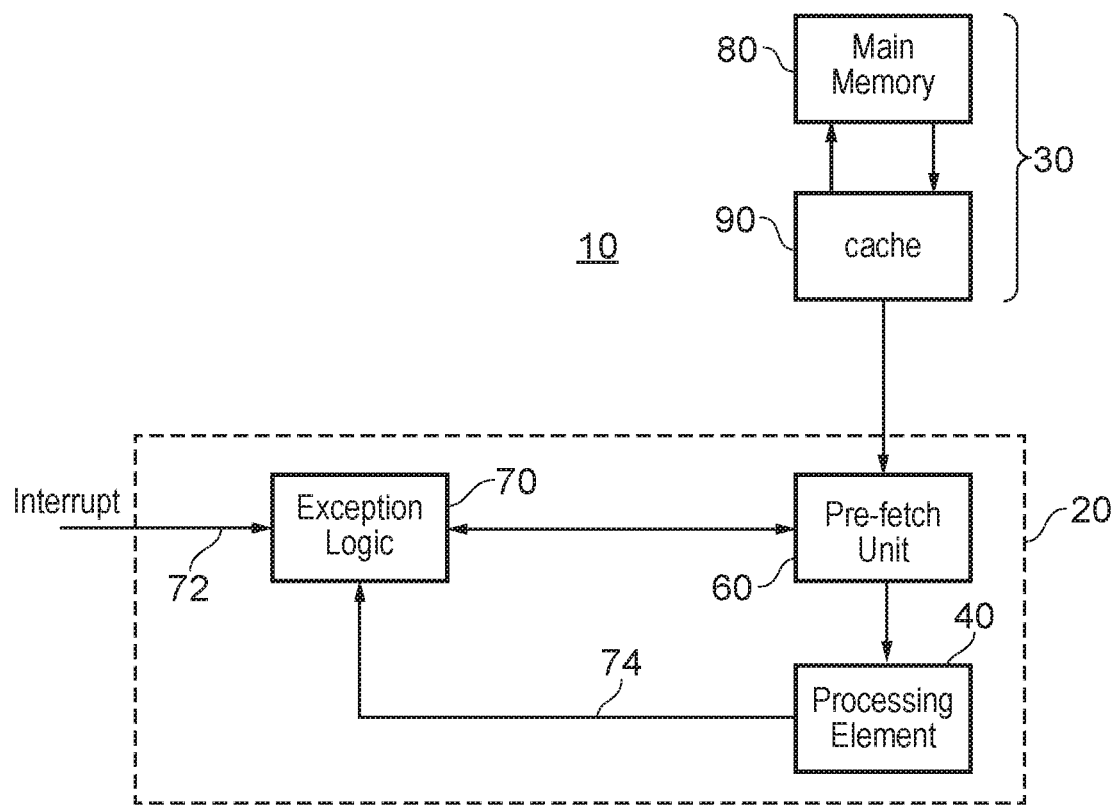
FIG. 1 schematically illustrates processing system.

Referring now to the drawings, FIG. 1 is a schematic diagram of a processing system 10 comprising a data processing apparatus 20 connected to a memory arrangement 30.

The data processing apparatus 20 comprises a processing element or processor core 40 associated with or including an instruction pre-fetch unit 60 and exception logic 70. It is noted that other logic or components may be present, but these are not shown for clarity of the diagram.

The memory arrangement 30 comprises a main memory 80 and a cache memory 90 disposed between the main memory 80 and the pre-fetch unit 60.

The pre-fetch unit 60 acts as a pipelined instruction fetching unit configured to fetch instructions from memory during a pipeline period of two or more processor clock cycles prior to execution of those instructions by the processor core 40. Generally speaking, the pre-fetch unit 60 is configured to fetch instructions from the cache 90 or, if they are not present in the cache, from the main memory 80 or any intervening cache levels (which, for simplicity of the diagram, are not shown in FIG. 1) and to route those instructions to a decoder of the processor core 40 for decoding.

Note that instead of a unified instruction and data cache 90, in other examples a separate instruction cache and a data cache could be provided.

The processor core 40 and the pre-fetch unit 60 therefore cooperate to provide an example of a processor configured to execute instructions, the processor having a pipelined instruction fetching unit configured to fetch instructions from memory during a pipeline period, for example of two or more processor clock cycles, prior to execution of those instructions by the processor.

The reason that the cache 90 is used is that typical processor cores can process instructions and data rather faster than they can be handled by off-chip memories. Access to the main memory 80 can therefore be relatively slow, potentially taking several processor clock cycles or even several tens of processor clock cycles. This is because the main memory 80 is typically implemented as an off-chip memory system, which is to say that the main memory 80 is embodied as one or more separate integrated circuits to that on which the data processing apparatus 20 is embodied. In contrast, the cache 90 is generally implemented on the same integrated circuit as the processor core 40 and are arranged so as to provide access to the stored data and instructions at a comparable speed to the processing speed of the processor core.

This means that if a required item such as a next instruction is present in the cache 90, then accessing that required item from the cache 90 can be significantly quicker than accessing it from the main memory 80. However, if there is a so-called "cache miss", such that a required item is not present in the cache, that it then has to be accessed from the main memory 80, and typically loaded into the cache, which can be a rather slower process. The result is that in many situations, using the cache can provide an improvement in the average speed of memory access, but from one particular memory access operation to another there can be a significant variation in memory access speed. In other words, the use of the cache 90 can introduce some unpredictability in the speed of access of a next-required instruction.

As mentioned above, the pre-fetch unit 60 is a pipelined arrangement which operates over a plurality of processor clock cycles. In an example arrangement, a four-stage pre-fetch unit is used. However, it will be appreciated that different numbers of stages may be used, such as a three-stage or a five-stage pre-fetch unit. In the example four-stage pre-fetch unit, if the pre-fetch unit starts to load an instruction from a particular address in a processor clock cycle n, that instruction is available for execution in the processor clock cycle n+3.

The exception logic 70 handles so-called exceptions, and in particular is configured to respond to a detected processing exception having an exception type selected from a plurality of exception types, by storing a current processor status and diverting program flow to an exception address dependent upon the exception type so as to control the instruction fetching unit to initiate fetching of an exception instruction at the exception address. Other aspects of the handling of exceptions will be discussed below.

During normal program flow, the program counter associated with the processor core 40 increases sequentially through the address space, unless a branch occurs to another address or a so-called branch-with-link occurs to make use of a subroutine. An exception occurs when this normal flow of execution is diverted to allow the processor to handle different events corresponding to internal or external items. These events might be (for example) externally generated interrupts 72, for example when a peripheral device requires a newly-captured data item to be processed, or internally generated events 74 such as the processor trying to access an undefined or unallowable memory address. It is known to handle multiple different exception types in different ways.

Some examples of exception types are provided in the following list:

Reset
A "hard" reset occurs when a particular physical connection to the processor (such as a processor reset pin) is asserted. A "soft" reset can achieve the same effect without requiring an assertion of the reset pin, by branching program flow to the reset vector in the exception vector table.

Undefined Instruction
This event type occurs if neither the processor, nor any attached coprocessor, recognizes the currently executing instruction.

Software Interrupt (SWI)
This is a user-defined synchronous interrupt instruction.

Prefetch Abort
This event type occurs when the processor attempts to execute an instruction that was not fetched, because the address was illegal. An illegal virtual address is one that does not currently correspond to an address in physical memory, or one that the memory management subsystem has determined is inaccessible to the processor in its current mode.

Data Abort
A data abort occurs when a data transfer instruction attempts to load or store data at an illegal address.

IRQ (Interrupt Request)
An IRQ happens when the processor external interrupt request pin is asserted and interrupts are currently enabled.

FIQ (Fast Interrupt Request)
An FIQ is a response to the processor external fast interrupt request pin being asserted when fast interrupts are currently enabled.

So-called "traps" are also handled by a mechanism similar to that used for interrupts, although their significance is not normally the same. Interrupts, whether initiated externally (for example IRQ or FIQ) or internally (for example, SWI) lead to an action, generally a change in exception level and then a subsequent return to the previous program flow. By contrast, a trap is generally initiated by a signal indicating some sort of a processing failure or error condition and may require a transfer to another program such as a recovery program, not necessarily associated with a subsequent return to the original program flow. Nevertheless, a trap can initiate a change in exception level of the type discussed here.

In other examples, traps are not necessarily only used to handle errors requiring recovery. They are also widely used when a hypervisor is implemented, for example to make it appear to the lower exception level (EL1 in this case) that an instruction is correctly executed, while the hypervisor can adapt the behaviour to the real platform.

The example exceptions therefore include initiation of a processor interrupt; an attempt by the processing element to execute an undefined instruction; an attempt by the processing element to access a privileged operating system function, and a change in program flow to handle a trap condition.

In operation, the exception logic 70 responds to an external (72) or internal (74) control signal indicating that an exception has occurred. In fact, although a single respective control signal is shown in each case 72, 74 for simplicity of the diagram, the exception logic 70 is in fact responsive to multiple different sources of exception events such as various circuitry connected to external connections or pins of the data processing apparatus 20 and logic for detecting abort or undefined operations by the processor core 40. In response to the control signals 72, 74, the exception logic instructs the pre-fetch unit 60 to empty or flush the pre-fetch pipeline (which is to say, to discard any instructions which are part-way through the multi-stage pre-fetch pipeline) and to start to fetch a first instruction of program code relating to the handling of the exception.

The processing element 40 operates according to a current "exception level". In an example arrangement, exception levels are categorised as four levels EL0-EL3. Other categorisations or numbers of levels may be used.

EL0 is sometimes referred to as unprivileged execution and has the lowest execution privilege of all of the exception levels. At this level, the software being executed by the processing element 40 has limited access to one or more of the list consisting of: (i) certain instruction types, (ii) system facilities such as a system timer or system controller, (iii) memory, certain memory address ranges, or peripherals.

Higher exception levels EL1-EL3 have higher respective privilege levels, which is to say that the restrictions applied to EL0 are lifted or relaxed to various extents for each higher exception level. In some examples, the exception levels are associated with operations categorised as:

EL0: Applications.
EL1: OS (operating system) kernel and associated functions that are typically described as privileged.
EL2: Hypervisor.
EL3: Secure monitor.

The processing element 40 is configured to change the current exception level in response to one or both of: (i) initiating a process to handle a processing element exception; and (ii) returning from a process to handle a processing element exception. On handling an exception, the current exception level either increases or remains the same. On returning from an exception, the current exception level either reduces or stays the same. Every exception type (such as those described above) has a target exception level which is, for example, either implicit in the nature of the exception or defined by configuration bits of system registers (not shown in FIG. 1).

In some examples, the Exception levels each have an associated dedicated Stack Pointer register. In the four exception level example mentioned above, these can be referred to as SP_EL0, SP_EL1, SP_EL2 and SP_EL3, where the last three characters indicate the associated exception level. These registers are used to point to a respective dedicated stack that can, for example, be used to store registers which are corrupted by (or have the potential to be corrupted by) the exception handler, so that they can be restored to original values before returning to the code which was running before the exception was handled.

Therefore, in these examples, the current operating state of the processing element corresponds to an exception level. The processing element is configured to operate according to a current exception level selected from a set of two or more exception levels; and the register bank provides a respective banked version of the given system register SP_ELn for each of the set of two or more exception levels ELn.

Exception handling code (to handle an exception at exception level ELn, where n< >0) may switch from using SP_ELn to SP_EL0. For example, it may be that SP_EL1 points to a piece of memory which holds a small stack that the kernel can guarantee to always be valid. SP_EL0 might point to a kernel task stack which is larger, but not guaranteed to be safe from overflow. This switching is controlled by writing to an [SPSel] control bit in a control register associated with the processing element 40.

Example embodiments are relevant to so-called out-of-order (OOO) processors or data processing circuitry. However, it is not a requirement that OOO processing is used in association with the present techniques.

Out-of-order processing involves decoding and executing instructions according to the availability of the input data rather than necessarily the order in which the occurred can be programmed code for execution. This can provide a degree of performance improvement because each instruction has to wait primarily for its own input to be ready rather than for the proceeding instruction in the program code order to be executed. Note that the term "out-of-order" does not require that instructions are executed in an order which is different to the program code order, but that the instructions can be executed in a different order of this nature.

Figure 2:
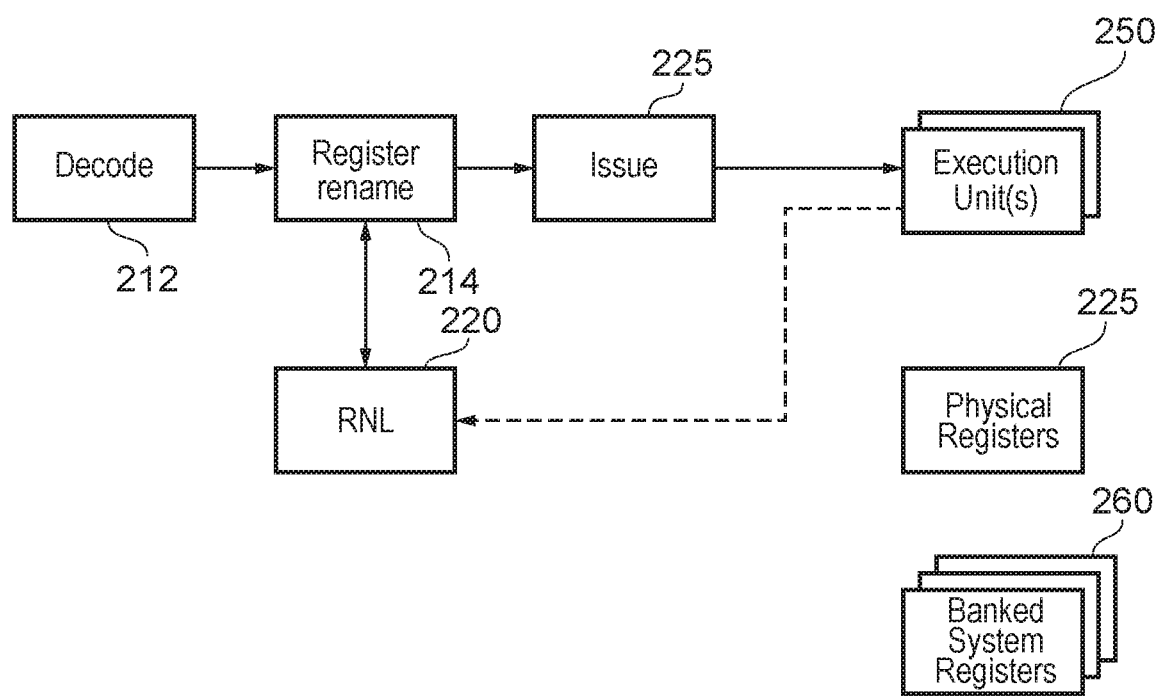
FIG. 2 schematically illustrate a processor arrangement.

An example processor arrangement is shown schematically in FIG. 2.

Fetched instructions are provided to instruction decode circuitry 212 to decode the instructions for execution.

Register renaming circuitry 214 has access to a renaming list (RNL) 220 which maintains a list of the current or prevailing correspondence between so-called architectural registers and physical registers. The register renaming circuitry 214 and the RNL 220 therefore together act as an example of mapping circuitry to allocate one or more other architectural registers to respective physical registers.

Architectural registers are those program registers specified by the instruction set architecture. Physical registers 225 are those program registers provided by the physical execution hardware of the processor. In some situations there may be a larger number of physical registers than the number of available architectural registers. When an instruction is decoded and prepared for execution, any architectural registers referenced by that instruction are mapped to available ones of the physical registers by the register renaming circuitry 214 The mapping, for example in terms of sets of so-called tag data, is maintained by the RNL 220. The RNL 220 can issue a stall indication in instances where the RNL has run out of available physical registers for a mapping (as required by the decoding of an instruction) to be implemented.

Decoded instructions are passed from the register renaming circuitry 214 to issue circuitry 225 to issue instructions for execution. The issue circuitry 225 has (or is associated with) circuitry providing one or more queues to provide a buffer for instructions for which the results of execution have not yet been "committed", or output into the program flow after execution.

In the present example, execution is performed by one of a set of one or more execution units 250.

FIG. 2 also illustrates a set of banked system registers 260. Banking a register implies maintaining multiple copies or versions of that register at the same address. There is a different one of the banked versions for each processor exception level, so that instruction execution at an exception level is handled with respect to the banked version of the register applicable to that exception level.

Various aspects relating to the handling of system registers such as the stack pointer (SP) register (but also applicable to other system registers such as a saved processor status register and/or an exception link register) will now be discussed.

At a basic level, in previously proposed arrangements a system register such as the SP register does not use renaming. A write to the system register can be carried out only in response to a committed instruction. That is to say, speculative writing to the system register is not possible. In turn this implies that speculative entry into (or return from) an exception is not possible.

On the other hand, non-system registers can be renamed (or mapped from an architectural name to a physical register) and can be written to speculatively. However, using this arrangement in a system of banked registers may not be area-efficient (in an integrated circuit implementation for example) because each architectural register (of which one would be required for each banked version) adds processing overhead.

The arrangement of FIGS. 1 and 2 can provide an example of data processing apparatus comprising: a processing element 40 configured to access (as discussed below) an architectural register representing a given system register; mapping circuitry (214, 220) to map the architectural register representing the given system register to a physical register selected from a set (225) of physical registers; a register bank (260) having a set of two or more respective banked versions of the given system register, in which a respective one of the banked versions of the system register is associated with each of a plurality of current operating states of the processing element; in which, as discussed below, when the processing element changes operating state from a first operating state associated with a first one of the banked versions of the system register to a second operating state associated with a second, different, one of the banked versions of the system register, the processing element is configured to store the current contents of the architectural register representing the given system register to the first one of the banked versions of the system register and to copy the contents of the second one of the banked versions of the system register to the architectural register representing the given system register.

Figure 3:
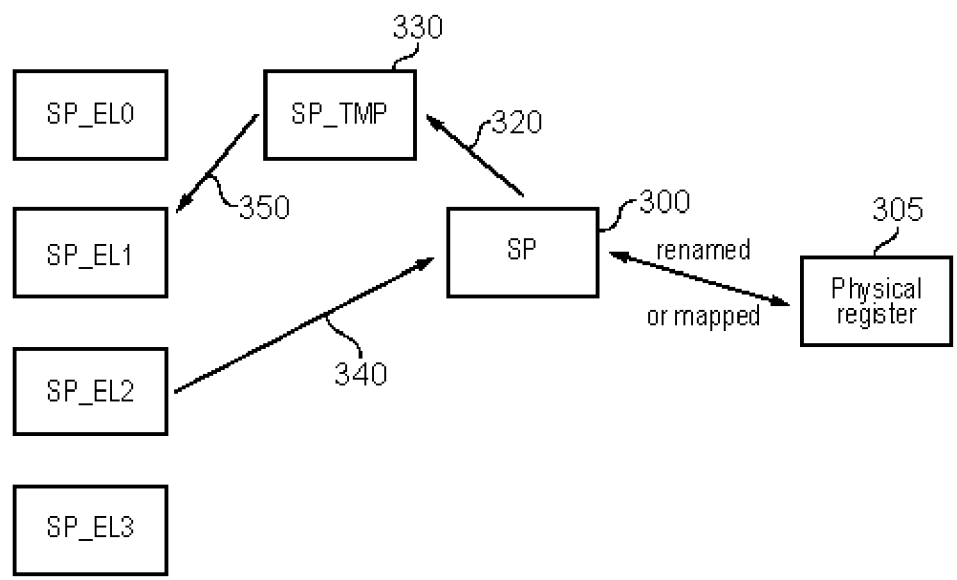
FIG. 3 schematically illustrates a the use of architectural and banked versions of a system register.

Referring to FIG. 3, these problems can potentially be alleviated by mapping an architectural register 300 representing a given system register (such as the SP register) to a physical register 305 selected by (for example) the register renaming circuitry 214 and the RNL from the set 225 of physical registers. So, the architectural register 300 represents a "current SP register". There is no need to provide a respective architectural version of the SP register for each exception level. Note that it is also not necessary for this to be performed in the context of an OOO processor; the mapping of the SP register could be carried out by the mapping circuitry in the absence of renaming of other (for example non-system) architectural registers.

In the example of four exception levels EL0-EL3, four banked versions of the SP register are maintained, namely SP_EL0 . . . SP_EL3. However, executed program code refers to the architectural SP register 300.

Changing Exception Level

FIG. 3 also schematically illustrates a process for using a different SP register value in response to a change of exception level, for example on a change from EL1 to EL2.

At a first step 320, the contents of the architectural SP register 300 are written to a temporary location SP_TMP 330. Note that SP_TMP might not be a specific register. In some example arrangements it may be a general purpose temporary register that can be used at other times for other operations.

Then at a step 340, the contents of the banked SP_EL2 are written to the architectural SP register 300.

Finally, at a step 350, the temporary value stored in the temporary location SP_TMP 330 is written to the banked version of SP_EL1.

These steps can be implemented by an instruction or by micro-operations associated with implementing a change in exception level by the processing element 40.

Figure 4:
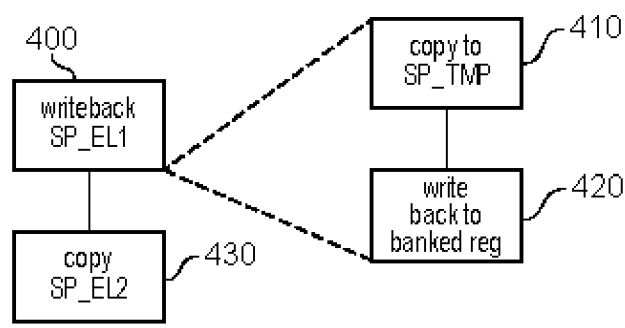

FIG. 4 is a schematic flowchart illustrating these steps. A step 400 involves writing back the contents of the architectural SP register 300 to SP_EL1, which in turn involves copying the contents of the SP register 300 to SP_TMP (at a step 410) and writing the contents of SP_TMP to SP_EL1 at a step 420. Note that the remainder of the process (and indeed further speculative instruction execution) can continue before the write at the step 420 is committed. At a step 430 the contents of the banked SP_EL2 are written to the architectural SP register 300. The step 410 therefore provides an example in which the processing element is configured to store the current contents of the architectural register representing the given system register as a temporary copy and to write the temporary copy to the first one of the banked versions of the system register.

Speculative Exception Level Change

The write back operation 350 to the banked register SP_EL1 in FIG. 3 requires the instruction relevant to the initiation of the exception level change to be committed.

However, the write operation 320 can be carried out speculatively, as can the write operation 340 which establishes the new version of the SP register in the architectural register 300. Therefore a next instruction to be speculatively executed which needs to access the SP register can do so via the architectural register 300 without the need to stall that instruction.

Therefore, in these examples, the processing element is configured to speculatively execute change in operating state subject to subsequent commitment of the speculatively executed change in operating state; and the processing element is configured to speculatively write the temporary copy to the first one of the banked versions of the system register and to commit the speculative write in response to commitment of the speculatively executed change in operating state.

Exception Level Change—Summary

Referring to FIG. 5, at a step 500, an exception occurs in the manner discussed above. This prompts, at a step 510, a change in exception level. As part of handling the change in exception level, the process of FIGS. 3 and 4 is implemented for example by micro operations. At a step 520, the exception is handled. The exception handling code accesses the now-current version of the SP register 300 which is (by virtue of the operations of FIGS. 3 and 4) appropriate to the current exception level.

At a step 530, the processing returns from the exception handling step 520 which may involve a change of exception level as discussed above at a step 540, so that the first instruction to be executed after the change at the step 540 accesses the newly appropriate SP register via the architectural register 300.

Use of the SPSel Bit

It is also possible as mentioned above to alter the default mapping of banked stack pointer SP_ELn to exception level ELn, by setting the SPSel control bit. In the present examples, this can have the effect of selectively causing ELn (where n>=1) to use SP_EL0. Such an arrangement is illustrated schematically by FIG. 6 in which the action of setting SPSel to one value or the other at a step 600 causes the use for ELn of SP_ELn (a step 610) or SP_EL0 (a step 620).

FIG. 7 is a schematic flowchart similar to FIG. 4 but illustrating micro operations associated with the setting of SPSel in the arrangement of FIG. 3. The flowchart assumes, for example, that a current exception level is EL1, so that before the setting of SPSel, the use of SP_EL1 is appropriate to the execution of the current code.

At a step 700, similar to the step 410, the contents of the SP register 300 are copied to SP_TMP 330. At a step 710, the contents of SP_EL0 are written to the SP register 300. At a step 720, the contents of SP_TMP are written to SP_EL1. Finally at a step 730, the SPSel bit is set so as to force the use of SP_EL0 even though the exception level is currently EL1.

Therefore, in these examples, each of the banked versions of the system register is associated with a respective operating state according to a default association; and the processing element is configured to execute a program instruction to select one of the banked versions of the system register, other than the banked version of the system register according to the default association, to be associated with the current operating state of the processing element.

Note that the processor 40 is an OOO processor. Therefore, in the course of execution of a set of program instructions in an OOO manner, it is possible that multiple banked register changes may occur speculatively and substantially at the same time (or at least so as to overlap in effect). For example, a change from EL1 to EL2 may be followed by an SPSel change in EL2 before a return to EL1 is performed. To achieve such overlapping or nested EL changes, multiple SP_TMP registers may be used, with the copies being performed in order. The updates to the architectural register are also performed in order of instruction commitment.

Finally, by way of summary, FIG. 8 is a schematic flowchart illustrating a method comprising:

accessing (at a step 800) an architectural register representing a given system register;

mapping (at a step 810) the architectural register representing the given system register to a physical register selected from a set of physical registers;

accessing (at a step 820) a register bank having a set of two or more respective banked versions of the given system register, in which a respective one of the banked versions of the system register is associated with each of a plurality of current operating states of the processing element;

in response to a change of operating state from a first operating state associated with a first one of the banked versions of the system register to a second operating state associated with a second, different, one of the banked versions of the system register, storing (at a step 830) the current contents of the architectural register representing the given system register to the first one of the banked versions of the system register and copying (at a step 840) the contents of the second one of the banked versions of the system register to the architectural register representing the given system register.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing apparatus comprising:
a processing core configured to access an architectural register representing a given system register;
register renaming circuitry to map the architectural register representing the given system register to a physical register selected from a set of physical registers;
a register bank having a set of two or more respective banked versions of the given system register, in which a respective one of the banked versions of the given system register is associated with each of a plurality of current operating states of the processing core;
in which, when the processing core changes operating state from a first operating state associated with a first one of the banked versions of the given system register to a second operating state associated with a second, different, one of the banked versions of the given system register, the processing core is configured to store current contents of the architectural register representing the given system register to the first one of the banked versions of the given system register and to copy contents of the second one of the banked versions of the given system register to the architectural register representing the given system register;
in which the processing core is configured to:
store the current contents of the architectural register representing the given system register as a temporary copy and to write the temporary copy to the first one of the banked versions of the given system register;
speculatively execute a change of operating state subject to subsequent commitment of the speculatively executed change of operating state; and
speculatively write the temporary copy to the first one of the banked versions of the given system register and to commit the speculative write in response to commitment of the speculatively executed change of operating state.

2. The data processing apparatus according to claim 1, in which:
a current operating state of the processing core corresponds to an exception level, processing core being configured to operate according to a current exception level selected from a set of two or more exception levels; and
the register bank provides a respective banked version of the given system register for each of the set of two or more exception levels.

3. The data processing apparatus according to claim 2, in which the processing core is configured to change the current exception level in response to one or both of:
initiating a process to handle a processing core exception; and
returning from a process to handle a processing core exception.

4. The data processing apparatus according to claim 3, in which the processing core exception comprises an exception selected from the list consisting of:
initiation of a processor interrupt;
an attempt by the processing core to execute an undefined instruction;
an attempt by the processing core to access a privileged operating system function; and
a change in program flow to handle a trap condition.

5. The data processing apparatus according to claim 1, in which:
each of the banked versions of the given system register is associated with a respective operating state according to a default association; and
the processing core is configured to execute a program instruction to select one of the banked versions of the given system register, other than the banked version of the given system register according to the default association, to be associated with a current operating state of the processing core.

6. The data processing apparatus according to claim 1, in which the given system register is selected from the list consisting of:
   a stack pointer register;
   a saved processor status register; and
   an exception link register.

7. The data processing apparatus according to claim 1, in which:
   the register renaming circuitry comprises renaming circuitry to allocate one or more other architectural registers to respective physical registers; and
   the processing core is an out of order processing core.

8. Data processing apparatus comprising:
   means for accessing an architectural register representing a given system register;
   means for performing register renaming to map the architectural register representing the given system register to a physical register selected from a set of physical registers;
   means for accessing a register bank having a set of two or more respective banked versions of the given system register, in which a respective one of the banked versions of the given system register is associated with each of a plurality of current operating states of the means for accessing the architectural register representing the given system register;
   means, responsive to a change of operating state from a first operating state associated with a first one of the banked versions of the given system register to a second operating state associated with a second, different, one of the banked versions of the given system register, for storing current contents of the architectural register representing the given system register to the first one of the banked versions of the given system register and for copying contents of the second one of the banked versions of the given system register to the architectural register representing the given system register;
   in which:
   the means for accessing the register bank is configured to store the current contents of the architectural register representing the given system register as a temporary copy and to write the temporary copy to the first one of the banked versions of the given system register;
   the apparatus is configured to speculatively execute a change of operating state subject to subsequent commitment of the speculatively executed change of operating state; and
   the means for accessing the register bank is configured to speculatively write the temporary copy to the first one of the banked versions of the given system register and to commit the speculative write in response to commitment of the speculatively executed change of operating state.

9. A method comprising:
   accessing an architectural register representing a given system register;
   performing register renaming to map the architectural register representing the given system register to a physical register selected from a set of physical registers;
   accessing a register bank having a set of two or more respective banked versions of the given system register, in which a respective one of the banked versions of the given system register is associated with each of a plurality of current operating states of a processing core;
   in response to a change of operating state from a first operating state associated with a first one of the banked versions of the given system register to a second operating state associated with a second, different, one of the banked versions of the given system register, storing current contents of the architectural register representing the given system register to the first one of the banked versions of the given system register and copying contents of the second one of the banked versions of the given system register to the architectural register representing the given system register, the storing step comprising storing the current contents of the architectural register representing the given system register as a temporary copy and writing the temporary copy to the first one of the banked versions of the given system register; and
   speculatively executing a change of operating state subject to subsequent commitment of the speculatively executed change of operating state; and
   the storing step comprising speculatively writing the temporary copy to the first one of the banked versions of the given system register and committing the speculative write in response to commitment of the speculatively executed change of operating state.

* * * * *